United States Patent
Venkatasubramanian et al.

(10) Patent No.: US 12,128,793 B2
(45) Date of Patent: Oct. 29, 2024

(54) DEVICE AND METHOD TO DETERMINE AVAILABLE REGENERATIVE BRAKING ENERGY IN A ROUTE FOR VEHICLE

(71) Applicants: Robert Bosch GmbH, Stuttgart (DE); Robert Bosch Engineering and Business Solutions Private Limited, Bangalore (IN)

(72) Inventors: Ranganathan Venkatasubramanian, Coimbatore (IN); Selvam Gokul Prasanth, Salem (IN)

(73) Assignees: Robert Bosch GmbH, Stuttgart (DE); Robert Bosch Engineering and Business Solutions Private Limited, Bangalore (IN)

( * ) Notice: Subject to any disclaimer, the term of this patent is extended or adjusted under 35 U.S.C. 154(b) by 310 days.

(21) Appl. No.: 17/652,307

(22) Filed: Feb. 24, 2022

(65) Prior Publication Data
US 2022/0274490 A1  Sep. 1, 2022

(30) Foreign Application Priority Data
Feb. 27, 2021  (IN) .............................. 202141008323

(51) Int. Cl.
*B60L 7/10* (2006.01)
*B60L 7/00* (2006.01)
*G07C 5/00* (2006.01)
*G07C 5/02* (2006.01)

(52) U.S. Cl.
CPC .................. *B60L 7/10* (2013.01); *G07C 5/02* (2013.01); *B60L 2270/00* (2013.01)

(58) Field of Classification Search
None
See application file for complete search history.

(56) References Cited

U.S. PATENT DOCUMENTS

| | | | |
|---|---|---|---|
| 7,925,426 B2* | 4/2011 | Koebler | G07C 5/085 |
| | | | 701/123 |
| 2007/0112475 A1 | 5/2007 | Koebler et al. | |
| 2016/0176402 A1* | 6/2016 | Andersson | B60W 30/16 |
| | | | 701/96 |
| 2019/0121661 A1* | 4/2019 | Kanada | H02J 7/143 |
| 2021/0405104 A1* | 12/2021 | Naderivesal | G01R 31/006 |
| 2022/0227237 A1* | 7/2022 | Otanez | B60W 10/18 |

* cited by examiner

*Primary Examiner* — Adam D Tissot
(74) *Attorney, Agent, or Firm* — Maginot, Moore & Beck LLP

(57) ABSTRACT

A device and method determines available regenerative braking energy in a route for a target vehicle. The device is in communication with a navigation unit and is configured to split the at least one route between a source and a destination into multiple segments followed by determining vehicular data of the target vehicle. The device determines available/recoverable regenerative braking energy in the at least one route for the target vehicle based on selective vehicular data of other vehicles similar to the target vehicle, which have travelled through the at least one route. The device is configured to dynamically predict the available regenerative braking energy originating from random longitudinal deceleration maneuvers for the chosen route from source location to the chosen destination location for any hybrid or electric vehicle. The device improves fuel efficiency and reduces emissions.

8 Claims, 3 Drawing Sheets

DEVICE AND METHOD TO DETERMINE AVAILABLE REGENERATIVE BRAKING ENERGY IN A ROUTE FOR VEHICLE

This application claims priority under 35 U.S.C. § 119 to patent application no. IN 202141008323, filed on Feb. 27, 2021 in India, the disclosure of which is incorporated herein by reference in its entirety.

The disclosure relates to a device and method to optimize regenerative braking in a vehicle.

BACKGROUND

A regenerative braking is a process of converting vehicle's kinetic energy into useful Electrical energy whenever the vehicle intends to decelerate. A typical "Hybrid Electric vehicle" will have an electric machine and an Internal Combustion Engine (ICE). The electric machine can act as a motor as well as a generator. Whenever the vehicle intends to move forward/reverse, the electric machine acts as a motor and provides the necessary drive torque to the wheels. Whenever the vehicle intends to decelerate, the same electric machine acts as a generator and supports in decelerating the vehicle. The electrical energy is generated during this process and the generated energy is stored in a battery. The amount of regenerative braking energy extracted during each braking event depends on various factors such as velocity of the vehicle when the brakes are applied, amount of braking torque requested, State of Charge (SoC) of the battery when the brakes are applied, electric machine and battery specifications, etc. The regenerative braking operation enhances the fuel efficiency of the vehicle as useful electrical energy is extracted from the vehicle's kinetic energy instead of dissipating the entire kinetic energy as heat through friction braking.

According to a prior art US2007112475, a power management system and device is disclosed. Described herein are devices, systems, and methods for managing the power consumption of an automotive vehicle, and thereby for optimizing the power consumption of the vehicle. The devices and systems for managing the power consumption of the vehicle typically include power management logic that can calculate an applied power for the vehicle engine based on information provided from the external environment of the vehicle, the operational status of the vehicle, one or more command inputs from a driver, and one or more operational parameters of the vehicle.

SUMMARY

According to an exemplary embodiment of the disclosure, a method determines available regenerative braking energy in a route for a target vehicle using a device. The target vehicle includes at least one electric machine and a navigation unit configured to receive an input signal concerning a source and a destination from a driver, the device is in communication with the navigation unit. The method includes splitting at least one route, between the source and the destination, into multiple segments, determining vehicular data of the target vehicle, and determining the available regenerative braking energy in the at least one route for the target vehicle based on relevant vehicular data of the target vehicle and other vehicles. The other vehicles correspond to vehicles which are similar to the target vehicle and which have travelled through the at least one route.

According to another exemplary embodiment of the disclosure, a method for determining available regenerative braking energy in a route for a target vehicle includes acquiring navigational inputs concerning a source and a destination from a driver, through a navigation unit, splitting at least one route between the source and the destination into multiple segments, determining vehicular data of the target vehicle, and determining the available regenerative braking energy in the at least one route for the target vehicle based on relevant vehicular data of the target vehicle and other vehicles. The other vehicles correspond to vehicles which are similar to the target vehicle, and which have travelled through the at least one route.

BRIEF DESCRIPTION OF THE DRAWINGS

An embodiment of the disclosure is described with reference to the following accompanying drawings.

DETAILED DESCRIPTION

Figure 1:
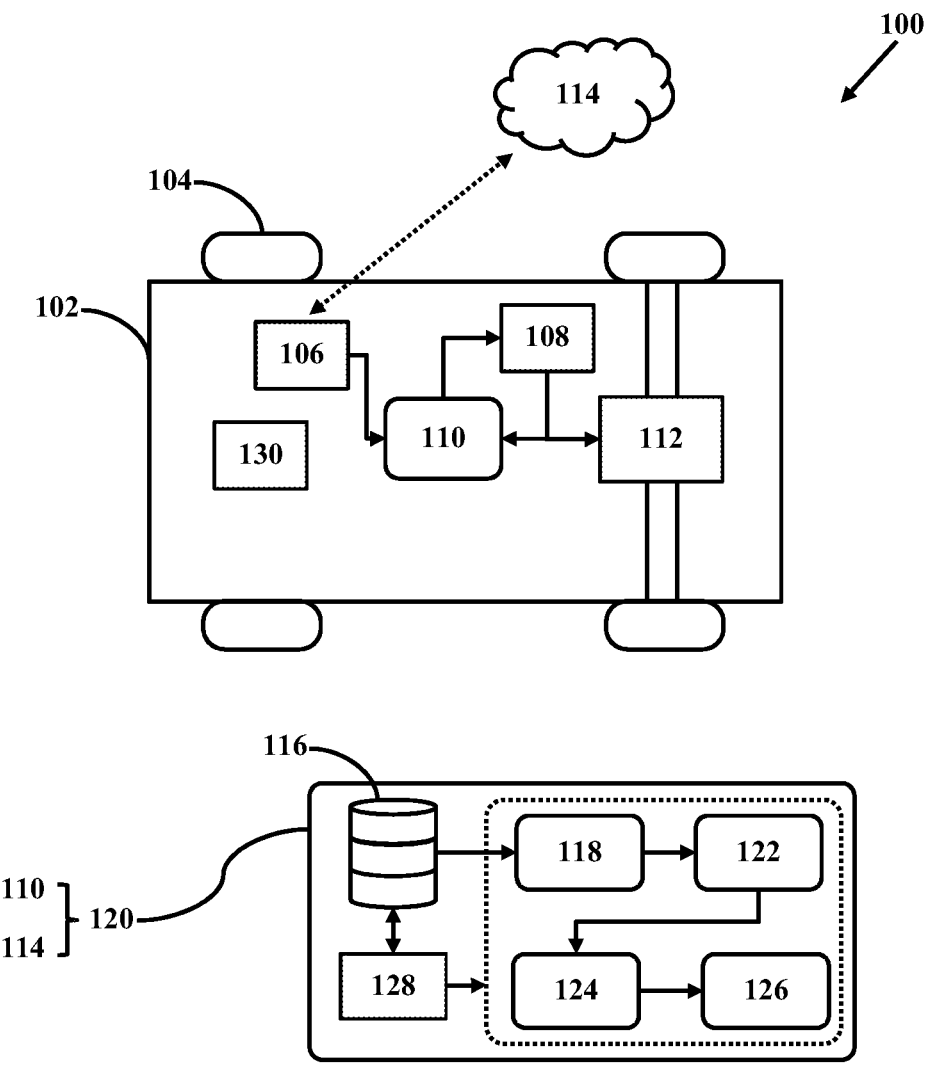
FIG. 1 illustrates a system comprising a device to determine available regenerative braking energy in a route for a target vehicle, according to an embodiment of the disclosure.

FIG. 1 illustrates a system comprising a device to determine available regenerative braking energy in a route for a target vehicle, according to an embodiment of the disclosure. The system 100 shows the target vehicle 102 comprising at least one electric machine 112. The target vehicle 102 is either a hybrid vehicle (mild or strong or other types, i.e. a combustion engine 130 and an electric engine) or an electric vehicle (i.e. only an electric engine). Further, a navigation unit 106 is provided to receive input signal concerning a source location and a destination location. The navigation unit 106 is equipped with or externally connected to a telecommunication unit (not shown for simplicity). Further, the vehicle 102 comprises front wheels 104 and rear wheels 104. The rear wheels 104 are coupled with the at least one electric machine 112. The at least one electric machine 112 is provided in the target vehicle 102 to either drive the wheels 104 or to be used only for recuperation or both. A battery 108 is also shown which supplies power to the at least one electric machine 112 to drive the target vehicle 102 and receives electric energy when the at least one electric machine 112 operates as generator (regenerative braking). The configuration of the at least one electric machine 112 is not limited to as described above and is applicable for any configuration known for the hybrid vehicle and electric vehicle. The system 100 also comprises an external server 114 (also referred to as a cloud) connected to the telecommunication unit. The device 120 is in communication with the navigation unit 106 and adapted to split the at least one route between the source and the destination into multiple segments followed by determining vehicular data of the target vehicle 102, characterized in that, the device 120 determines available/recoverable regenerative braking energy in the at least one route for the target vehicle 102 based on relevant (or necessary/required) vehicular data of the target vehicle and other vehicles 202, 204, ..., 206 (shown in FIG. 2). The other vehicles 202, 204, ..., 206 are those which are similar to the target vehicle 102 and travelled through the at least one route. Further, the device 120 is also configurable to determine available regenerative braking energy in the at least one route for the target vehicle 102 based on relevant vehicular data of the target vehicle and other vehicles 202, 204, . . . , 206. The other vehicles are those which are similar to the target vehicle 102, and which has not only travelled through the at least one route but also under similar driving conditions as that of the target vehicle 102.

The vehicular data comprises a class of vehicle, a subclass of the vehicle, weather, day, date, time, specifications of the at least one electric machine 112, specification of a battery 108, vehicle velocity profile, an aggressiveness index of the vehicle, a brake torque profile, a mean Aggressive Index (AI) deviation factor of the target vehicle 102 and a mean Average Vehicle Velocity (AVV) deviation factor of the target vehicle 102. The aggressiveness index is calculated in dependence of rate of change of acceleration/deceleration, which is also called as jerk. In other words, the vehicular data is composed of static data and dynamic data. Further, either all the vehicular data is taken at once for determining the similar vehicles or selective vehicular data, i.e. relevant/necessary vehicular data is taken as per the requirement, which is made clear in the description.

The group of vehicular data described above is determined for both the target vehicle 102 and the other vehicles 202, 204, . . . , 206. However, only the mean AI deviation factor and the mean AVV deviation factor are determined for the target vehicle 102 for which the available regenerative energy needs to be determined. Further, the determining of vehicular data corresponds to collection of corresponding data either through respective sensors or memory or calculation of the values.

According to an embodiment, the device 120 estimates available regenerative braking energy through at least one of a Vehicle Control Unit (VCU) 110 and an external server 114 wirelessly connected to the VCU 110. The VCU 110 is again either a single controller or a group of two or more controller within the vehicle. Similarly, the external server 114 comprises the single controller or group of two or more controller to process the inputs. In another alternative, both the VCU 110 and the server 114 determines the available regenerative braking energy in combined manner, i.e. each splitting the processing in predefined proportion or based on the availability of the processing capacity.

The controller comprises memory such as Random Access Memory (RAM) and/or Read Only Memory (ROM), Analog-to-Digital Converter (ADC) and vice-versa Digital-to-Analog Convertor (DAC), clocks, timers and a processor 128 connected with the each other and to other components through communication bus. The logics or instructions or programs are stored in the memory and accessed by the processor as per the defined routines. The internal components of the controller are not explained for being state of the art, and the same must not be understood in a limiting manner.

According to an embodiment of the disclosure, for determination of available regenerative braking energy, the device 120 is adapted to filter, using a filter module 118, other vehicles from a repository 116 (also referred to as a database) whose relevant vehicular data is similar/close to the relevant vehicular data of the target vehicle 102. The device 120 then calculates, by a computation module 122, a deviation factor for both of the aggressiveness index and the vehicle velocity for the target vehicle 102, in each segment of the at least one route, using corresponding relevant vehicular data of the target vehicle 102 and the filtered vehicles 202, 204, . . . , 206. The device 120 then calculates, by a regenerative energy module 124, the available regenerative braking energy for each of the filtered vehicle 202, 204, . . . , 206 in each segment of the at least one route based on relevant vehicular data comprising corresponding brake torque profile and velocity profile. The regenerative energy module 124 uses brake torque profile and velocity profile of filtered vehicles 202, 204, . . . , 206, but specification of at least one electric machine 112 and specification of battery 108 used is that of the target vehicle 102. The device 120 then estimates, by a prediction module 126, the available regenerative braking energy for the target vehicle 102 based on the calculated available regenerative braking energy of the filtered vehicles 202, 204, . . . , 206.

Figure 2:
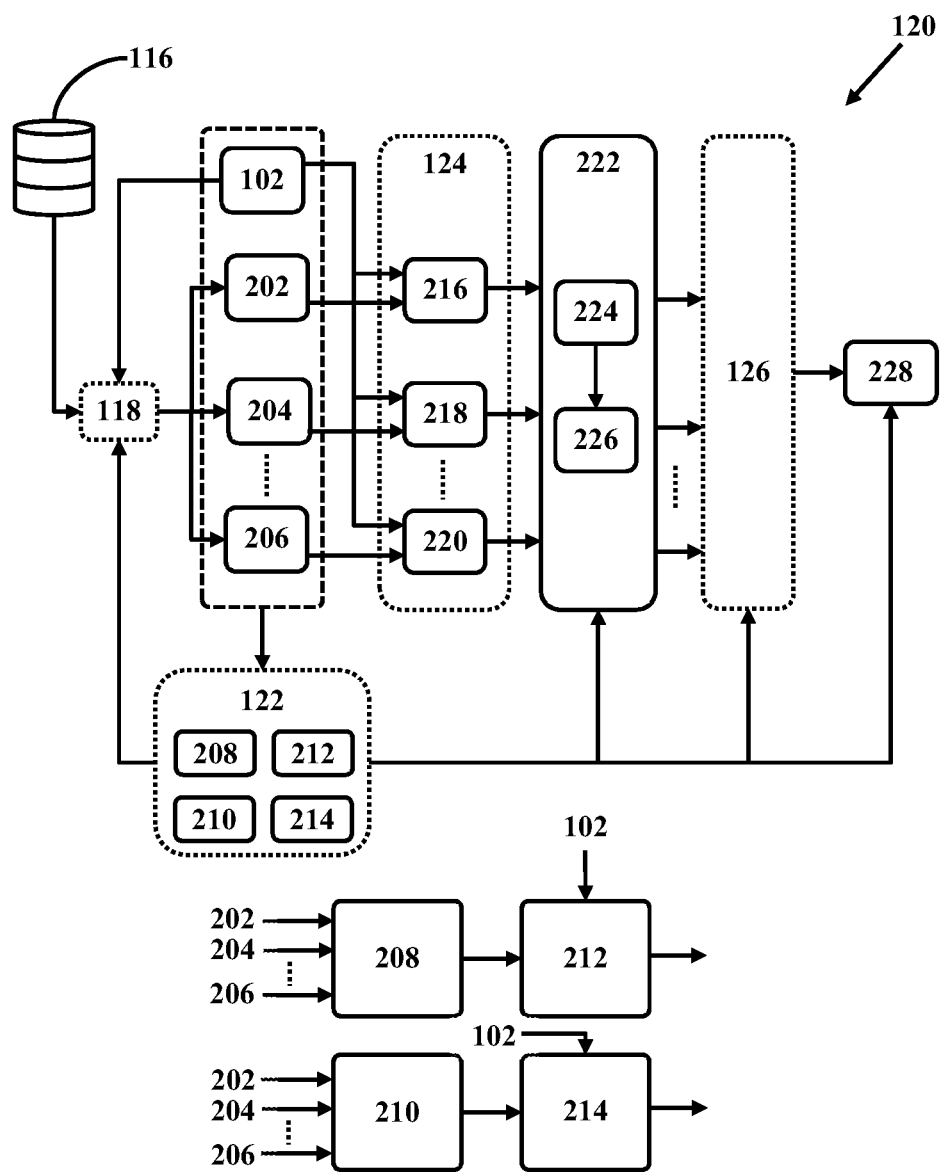
FIG. 2 illustrates the modules used for determination of available regenerative braking energy, according to an embodiment of the disclosure.

FIG. 2 illustrates the modules used for determination of available regenerative braking energy, according to an embodiment of the disclosure. The working of the system 100 or the device 120 is explained using the modules. The navigation unit 106 acquires navigation details from the driver such as but not limited to a source location, a destination location, and a desired/preferred route from a list of at least one routes to reach the destination location from source location. The device 120 comprises a segmentation module (not shown), which constantly segments the route. The segmentation module splits the distance between the source location and the destination location into 'N' number of equal/unequal segments. The route is split into multiple small routes to improve the accuracy of prediction/estimation of the available regenerative braking energy. The available regenerative braking energy is calculated for each segment, one after another or all at once based on available vehicular data. In one embodiment, the available regenerative braking energy for a second segment is calculated only after the vehicle enters the second segment. Alternatively, the available regenerative braking energy for the second segment is calculated before the vehicle enters the second segment, i.e., in the previous segment itself. If the driver changes the destination/selected route during the course of travel, the segmentation module performs/repeats the segmentation again between the current location of the target vehicle 102 and new destination location for the chosen route.

In an embodiment of the disclosure, history of vehicular data of different vehicles are stored in a repository 116. The repository 116 is either part of the device 120 (such as memory units) or is externally connected to the device 120. For accurate prediction, it is important to filter and choose only the relevant vehicular data. The device 120 determines list of vehicles which are similar to target vehicle 102 by using a filter module 118 and extracts corresponding relevant vehicular data. The filter module 118 processes the vehicular data of those vehicles which are found similar to vehicular data of the target vehicle 102 using, but not limited to, clustering algorithms such as k-nearest neighbors algorithm. Other algorithms which determines similarity is equally applicable and is within the scope of the disclosure. The filter module 118 considers following parameters (either all or as per requirement) of the target vehicle 102 for determining similar vehicles, which are, weather surrounding the target vehicle 102 (Example: 15 deg C., Rainy), day/date/time of travel, class and sub-class of the target vehicle 102 (Example: passenger vehicle/sedan, passenger vehicle/SUV, trucks, motorcycle, etc.), start location, end location and chosen route identification number for the present/current segment, the mean AI deviation factor of the target vehicle 102 and the mean AVV deviation factor of the target vehicle 102. Based on the above parameters, the filter module 118 compares the similarity of the relevant vehicular data between the target vehicle 102 and the other vehicles in the repository 116, and filters-out or extracts 'M' vehicles with corresponding relevant vehicular data. In the example, a first vehicle block 202, a second vehicle block 204 and a $m^{th}$ vehicle block 206 are extracted from the repository 116 for further processing. Each of the extracted block further contains relevant vehicular data, such as a corresponding average vehicle velocity calculated from respective velocity profile, average aggressiveness index calculated from corresponding rate of change of acceleration and a brake torque profile as requested by corresponding driver for each segment.

The filtered vehicular data are input to the computation module 122. The computation module 122 takes inputs from each of the 'M' vehicle blocks (excluding the target vehicle 102) and calculates a nominal average velocity and a nominal aggressiveness index through two sub-modules, namely a first nominal module 208 and a second nominal module 210, respectively. The computation module 122 also calculates the mean AI deviation factor and mean AVV deviation factor through further two sub-modules, i.e. a first deviation module 212 and a second deviation module 214, respectively for the target vehicle 102. The first deviation module 212 computes the mean AVV deviation factor by taking inputs as the nominal average velocity calculated by the first nominal module 208 and the average vehicle velocity obtained directly from the target vehicle 102. The second deviation module 214 computes the mean AI deviation factor by taking inputs as the nominal aggressiveness index calculated by the second nominal module 210 and the average aggressiveness index obtained from the target vehicle 102. The output of the first deviation module 212 and the second deviation module 214 is taken as input to the filter module 118 in closed loop manner to further refine the data considered for processing in the subsequent segment. For example, in a first segment the mean AI deviation factor and the mean AVV deviation factor are unknown and hence are assumed to be 1. However, the values of the mean AI deviation factor and the mean AVV deviation factor are learned by the end of the first segment. In a second segment, the learned values are taken as input by the filter module 118 along with the parameter values of the target value to again extract similar vehicles from the repository 116. The values of mean AI deviation factor and the mean AVV deviation factor are further learned and refined, which is again used in the subsequent segment. The processing done by the first deviation module 212 and the second deviation module 214 is explained in below paragraphs.

The computation module 122 is shown in detailed view for clarity and must not be understood in limiting sense. The calculations performed by the first deviation module 212 and the second deviation module 214 of the computation module 122 are explained below. The calculation of mean AI deviation factor is performed by the first deviation module 212. When the target vehicle 102 enters a segment 'k+1', the aggressiveness index (AI) deviation factor for the segment 'k' is calculated based on the aggressiveness index of the target vehicle 102 for the segment 'k' and the nominal aggressiveness index for the segment 'k'.

Aggressiveness Index deviation factor $[k] =$ $$\frac{\text{Aggressiveness Index of target vehicle}[k]}{\text{Nominal Aggressiveness Index}[k]}$$

The AI deviation factor is calculated at the beginning of every segment and a moving average of aggressiveness index deviation factors is calculated based on the below formula:

Mean Aggressiveness Index Deviation Factor =

$$\frac{\sum_{k=1}^{n-1}(\text{Agressiveness Index Deviation Factor}[k])}{n-1}$$

Where 'n' is the current segment of the target vehicle 102. When the target vehicle 102 is in first segment, the mean AI deviation factor is initialized to a value of 1.

The calculation of mean Average Vehicle Velocity (AVV) deviation factor is performed by the second deviation module 214 is elaborated below. When the target vehicle 102 enters segment 'k+1', the average vehicle velocity (AVV) deviation factor for the segment 'k' is calculated based on the average velocity of the target vehicle 102 for the segment 'k' and the nominal average vehicle velocity for the segment 'k'.

Average Vehicle Velocity deviation factor $[k] =$ $$\frac{\text{Average velocity of target vehicle}[k]}{\text{Nominal Average Vehicle Velocity}[k]}$$

The average vehicle velocity deviation factor is calculated at the beginning of every segment and a moving average of average vehicle velocity deviation factors is calculated based on the below formula:

Mean Average Vehicle Velocity Deviation Factor =

$$\frac{\sum_{k=1}^{n-1}(\text{Average Vehicle Velocity Deviation Factor}[k])}{n-1}$$

Where 'n' is the current segment of the target vehicle 102. When the target vehicle 102 is in first segment, the mean AVV deviation factor is initialized to a value of 1.

The purpose of mean AI deviation factor and the mean AVV deviation factor is to select those vehicles from other vehicles 202, 204, . . . , 206 which are similar/close to the driving characteristics of the target vehicle 102. The device 120 tries to understand the driver of the target vehicle 102 and filter the vehicles 202, 204, . . . , 206 available in the repository 116 only that are similar to the driver characteristics of target vehicle 102. In other words, the mean AI deviation factor and mean AVV deviation factor helps in classifying the driving characteristics of the vehicles (or it's driver), which is later used in filtering the similar vehicles 202, 204, . . . , 206.

The classification of driving characteristic of the vehicle or corresponding driver is done in following manner. A calm driver comprises a mean AI deviation factor<1, and drives at low average velocity, i.e. mean AVV deviation factor<1. An aggressive driver comprises mean AI deviation factor>1, and drives at low average velocity, i.e. mean AVV deviation factor<1. A calm driver may also comprise mean AI deviation factor<1, and drives at high average velocity, i.e. mean AVV deviation factor>1. Similarly, the aggressive driver may also comprise the mean AI deviation factor>1, and drives at high average velocity, i.e. mean AVV deviation factor>1). It is done in order to improve the accuracy of prediction.

The regenerative energy module 124 calculates the available regenerative braking energy from each of the filtered vehicle blocks 202, 204, . . . , 206 using respective brake torque profile and vehicle velocity profile for each of the segment. However, the specification of the electric machine 112 used to calculate the available regenerative braking energy is that of the target vehicle 102. The reason to use specification of electric machine 112 of the target vehicle 102 is to simulate the regenerative energy available for the target vehicle 102 if driven under the velocity profile and brake torque profile as that of each of the 'M' filtered vehicles 202, 204, . . . , 206 from the repository 116 under the similar driving conditions. Thus, the regenerative energy module 124 calculates a first available energy 216, a second available energy 218, and a $m^{th}$ available energy 220.

In accordance to an embodiment of the disclosure, a working of the first nominal module 208, the second nominal module 210 and a normalization module 22 are elaborated. The 'Aggressiveness Index' of a vehicle is the measure of rashness or jerkiness of the vehicle. The Aggressiveness Index is rated in a scale of 0 to 1, where '1' implies the most aggressive vehicle and '0' implied the least aggressive vehicle. This is one example of rating; other formats of rating are equally implementable. The 'Aggressiveness Index' of the vehicle is calculated based on the jerk profile (second derivative of vehicle velocity) of the corresponding vehicle. The nominal Aggressiveness Index for a segment is the 'most probable' Aggressiveness Index value among the Aggressiveness Index values recorded by similar drivers, driving similar vehicles under similar circumstances in the same segment. The nominal Aggressiveness Index is calculated by first nominal module 208 based on the Aggressiveness Indices of the 'M' number of filtered vehicular data.

Similarly, the nominal average vehicle velocity for the segment is the 'most probable' average vehicle velocity among the average vehicle velocities recorded by similar drivers, driving similar vehicles under similar circumstances in the same segment. The nominal average vehicle velocity is calculated by the second nominal module 210 based on the average vehicle velocities of the 'M' number of filtered vehicular data.

The device 120 further normalizes the estimated available regenerative braking energy through a normalization module 222 comprising two sub-modules namely a first normalization module 224 and a second normalization module 226. The normalization module 222 normalizes the calculated available regenerative braking energy for the 'M' filtered vehicles by processing through the calculated nominal aggressive index and nominal average velocity in a sequential manner. Alternatively, the normalization is first performed through the average velocity and followed by the normalization through the aggressiveness index. The normalized regenerative energy for each of the first available energy 216, the second available energy 218, and the $m^{th}$ available energy 220 are given as input to the prediction module 126.

The working of first normalization module 224 is elaborated below. Based on the 'M' number of simulated regenerative braking energy values, the 'M' number of Aggressive Index values and the nominal Aggressiveness Index, the first normalization module 224 calculates the 'M' number of 'Aggressiveness Index (AI) normalized regenerative braking energy' values.

$$\text{Normalization Factor } (N1) = \frac{\text{Nomimal Aggressiveness Index}}{\text{Aggressiveness Index of first vehicle}}$$

Similarly, $$\text{Normalization Factor } (N'M') = \frac{\text{Nomimal Aggressiveness Index}}{\text{Aggressiveness Index of } m^{th} \text{ vehicle}}$$

Thus,

AI normalized regenerative braking energy of first vehicle=simulated regenerative braking energy of first vehicle*Normalization Factor($N1$)

Similarly,

AI normalized regenerative braking energy of $m^{th}$ vehicle=simulated regenerative braking energy of $m^{th}$ vehicle*Normalization Factor($N'M'$)

If the Aggressiveness Index of a vehicle 'x' is higher than the nominal Aggressiveness Index, then the 'AI normalized regenerative braking energy' of vehicle 'x' will be lesser than the simulated regenerative braking energy of the vehicle 'x'. Similarly, if the Aggressiveness Index of the vehicle 'x' is lower than the nominal Aggressiveness Index, then the 'AI normalized Regenerative Braking Energy' of Vehicle 'x' will be greater than the Simulated Regenerative Braking Energy of Vehicle 'x'.

Now normalization based on average vehicle velocity is explained, i.e. working of second normalization module 226 is elaborated. Based on the 'M' number of 'AI normalized regenerative braking energy' values, the 'M' number of average vehicle velocities and the nominal average vehicle velocity, second normalization module 226 calculates the 'M' number of normalized regenerative braking energy values. In other words, the 'M' outputs of the first normalization module 224 is processed together with the 'M' number of average vehicle velocities and the nominal average vehicle velocity to calculate the 'M' number of normalized regenerative braking energy values.

$$\text{Normalization Factor } (N1) = \frac{\text{Nomimal Average Vehicle Velocity}}{\text{Average Velocity of first vehicle}}$$

Similarly, $$\text{Normalization Factor } (N'M') = \frac{\text{Nomimal Average Vehicle Velocity}}{\text{Average Velocity of } m^{th} \text{ vehicle}}$$

Thus,

Normalized regenerative braking energy of first vehicle=AI normalized regenerative braking energy of the first vehicle*Normalization Factor ($N1$)

Similarly,

Normalized regenerative braking energy of $m^{th}$ vehicle=AI normalized regenerative braking energy of $m^{th}$ vehicle*Normalization Factor ($N'M'$)

If the average velocity of the vehicle 'x' is higher than the nominal average vehicle velocity, then the normalized regenerative braking energy of vehicle 'x' will be lesser than the 'AI normalized regenerative braking energy of the vehicle 'x'. Similarly, if the average velocity of the vehicle 'x' is lower than the nominal average vehicle velocity, then the normalized regenerative braking energy of vehicle 'x' will be greater than the AI normalized regenerative braking energy of the vehicle 'x'.

The prediction module 126 processes the inputs using functions/algorithms such as curve fitting (not limited thereto) and predicts the final available regenerative braking energy for the current segment. An optional scaling module 228 is also provided to scale the predicted (and unscaled) available energy for the target vehicle 102 for the current segment based on the deviation factor calculated by the computation module 122.

In accordance to an embodiment of the disclosure, the scaling module 228 performs the scaling of the predicted available regenerative braking energy based on the mean AI deviation factor of the target vehicle 102 and mean AVV deviation factor to calculate the final available regenerative braking energy. In the first stage, the scaling is done based on mean AI deviation factor as below:

Available regenerative braking energy scaled with mean AI deviation factor=Available regenerative braking energy*mean AI deviation factor If the mean AI deviation factor for the target vehicle 102 is greater than 1, then the available regenerative braking energy scaled with mean AI deviation factor will be greater than the available regenerative braking energy. Similarly, if the mean AI deviation factor for the target vehicle 102 is lesser than 1, then the available regenerative braking energy scaled with mean AI deviation factor will be lesser than the available regenerative braking energy.

In a second stage, the scaling is done on the output of the first stage based on the mean AVV deviation factor. Based on the available regenerative braking energy scaled with mean AI deviation factor and target vehicle's mean AVV deviation factor, the final available regenerative braking energy is calculated, shown below:

Final available regenerative braking energy=Available regenerative braking energy scaled with mean AI deviation factor*mean AVV deviation factor If the mean AVV deviation factor for the target vehicle 102 is greater than 1, then the final available regenerative braking will be greater than the available regenerative braking energy scaled with mean AI deviation factor. Similarly, if the mean AVV deviation factor for the target vehicle 102 is lesser than 1, then the final available regenerative braking will be lesser than the available regenerative Braking energy scaled with mean AI deviation factor.

In accordance to another embodiment of the disclosure, the device 120 controls/optimizes/regulates the operation of the at least one electric machine 112 and/or the combustion engine 130 to maximize recovery of regenerative braking in the target vehicle 102.

In accordance to an embodiment of the disclosure, an implementation of the device 120 is disclosed. The device 120 is combination of VCU 110 and the server 114. The server 114 stores the vehicular data of all the vehicles of different classes and types along with the respective position using navigation units 106 and internal and external conditions. The VCU 110 transmits the vehicular data of the target vehicle 102 through the telecommunication unit to the server 114. The velocity profile and brake torque profile of the target vehicle 102 is sent to the server 114, not for the computation of the available regenerative braking energy of the target vehicle 102, but for the computation of an available regenerative braking energy of other vehicles that may travel in the same route in future. The server 114 executes the filter module 118, computation module 122, regenerative energy module 124, normalization module 222, prediction module 126 and the scaling module 228 and transmits back the available regenerative braking energy to the target vehicle 102. The VCU 110 then controls the target vehicle 102 to optimize the recovery of the predicted regenerative braking energy. The VCU 110 also displays to the driver to select the fuel efficient or energy efficient route among the list of routes. The processing is shared between the VCU 110 and the server 114 based on availability of processing load, availability or predefined routines.

In another implementation, the device 120 is just the VCU 110 and the memory of the VCU 110 is downloaded with the repository 116 from the sever. The determination of the available regenerative braking energy is entirely within the target vehicle 102.

Figure 3:
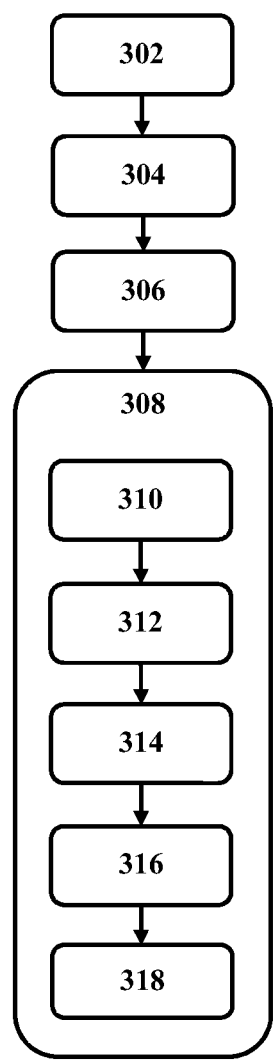
FIG. 3 illustrates a method for determining available regenerative braking energy in the route for the target vehicle, according to the disclosure.

FIG. 3 illustrates a method for determining available regenerative braking energy in the route for the target vehicle, according to the disclosure. A step 302 comprises acquiring navigational inputs concerning a source and a destination from a driver, through a navigation unit 106. A step 304 comprises splitting the at least one route, between the source and the destination, into multiple segments. The distance between the source location and destination location is split into 'N' number of equal/unequal segments. This step splits a big route into many small routes to improve the accuracy of prediction. The available regenerative braking energy is calculated for each segment, one after another, i.e. the available regenerative braking energy for a second segment is calculated only after the target vehicle 102 enters the second segment. Alternatively, the available regenerative braking energy for the second segment is calculated before the target vehicle 102 enters the second segment. In yet another alternative, the available regenerative braking energy is calculated for the entire route at once based on available vehicular data. If the driver changes the destination/selected route during the course of travel, this step is repeated again between the current location of the target vehicle 102 and new destination location for the chosen route. A step 306 comprises determining vehicular data of the target vehicle 102. The method is characterized by, a step 308 which comprises determining available regenerative braking energy in the at least one route for the target vehicle 102 based on relevant vehicular data of the target vehicle and other vehicles 202, 204, . . . , 206. The other vehicles 202, 204, . . . , 206 are those which are similar to the target vehicle 102, and which has travelled through the at least one route. Further, the step 308 may also comprises determining available regenerative braking energy in the at least one route for the target vehicle 102 based on relevant vehicular data of the target vehicle 102 and the other vehicles 202, 204, . . . , 206. The other vehicles 202, 204, . . . , 206 are those which are similar to the target vehicle 102, and which has not only travelled through the at least one route but also under similar driving conditions as that of the target vehicle 102. The method described herein complements the device 120 described above and therefore the description is kept concise for simplicity and to avoid unnecessary repetition. However, the same must not be understood in limiting manner.

The vehicular data comprises the class of vehicle, the subclass of the vehicle, weather, day, date, time, specifications of the at least one electric machine 112, specification of a battery 108, vehicle velocity profile, the aggressiveness index of the vehicle, the brake torque profile, the mean Aggressive Index (AI) deviation factor of the target vehicle 102 and the mean Average Vehicle Velocity (AVV) deviation factor of the target vehicle 102. The aggressiveness index is calculated in dependence of rate of change of acceleration/deceleration, which is also called as jerk. In other words, the vehicular data is composed of static data and dynamic data.

The step 308 is elaborated below for understanding the steps involved in working of the disclosure. A step 310 comprises filtering, using the filter module 118, the other vehicles 202, 204, . . . , 206 from the repository 116 whose relevant vehicular data is similar to the relevant vehicular data of the target vehicle 102. The repository 116 contains huge amount of history of vehicular data. For accurate prediction, it is important to filter and choose only the relevant vehicular data. The fields/parameters of the vehicular data present in the repository 116 that are similar (k-nearest neighbors algorithm) with the below fields/parameters of the target vehicle 102 are filtered and chosen for further processing: weather surrounding the target vehicle 102 (Eg: 15 deg C., Rainy), day, date, time of travel, the class and sub-class of the target vehicle 102 (Eg: Passenger vehicle/Sedan, Passenger vehicle/SUV, etc.), start location, end location and chosen route identification number for the present/current segment. Further, the mean Aggressiveness Index (AI) deviation factor of the target vehicle 102 and the mean average vehicle velocity (AVV) deviation factor of the target vehicle 102 are also used by the filter module 118.

A step 312 comprises calculating, by the regenerative energy module 124, available regenerative braking energy for each of the filtered vehicle 202, 204, . . . , 206 in each segment of the at least one route based on corresponding brake torque profile and velocity profile. In other words, the regenerative energy module 124 calculates simulated regenerative braking energy for the target vehicle 102. From the filter module 118, 'M' number of vehicular data is given as the output. In the step 312, the requested braking energy (requested braking torque profile and vehicle velocity profile) from each of the filtered history vehicular data and the parameters influencing the regenerative braking energy extraction of the target vehicle 102 are combined together to calculate 'M' number of regenerative braking energy values. The 'M' number of regenerative braking energy values corresponds to simulating the target vehicle 102 with the velocity and requested braking torque profiles of 'M' number of filtered vehicular data from the repository 116.

The regenerative braking power at any instant is proportional to the braking power at that instant.

(Regenerative Braking Power)α(Braking Power) which can be rewritten as, (Regenerative Braking Power)α(Vehicle Velocity×Requested Braking Torque) Thus, the 'M' number of filtered vehicular data results in 'M' number of simulated regenerative braking energy values for the target vehicle 102.

A step 314 comprises normalizing each of the simulated regenerative braking energy values. If the total number of filtered vehicular data for the given segment is 'M', then 'M' number of simulated regenerative braking energy values are calculated. The 'M' number of simulated regenerative braking energy values are subjected to two stages of normalization. A first normalization is based on the Aggressiveness Index (AI), and a second normalization is based on the Average Vehicle Velocity (AVV). The 'M' number of simulated regenerative braking energy values are given as the input to the first normalization module 224, where the normalization based on AI is performed. The output of the first normalization module 224 is given as the input to the second normalization module 226, where the normalization based on AVV is performed. The output of the second normalization module 226 is the normalized available regenerative braking energy.

A step 316 comprises estimating the available regenerative braking energy for the target vehicle 102 based on the 'M' number of normalized regenerative braking energy values. The estimation is done by the prediction module 126. The 'M' number of normalized regenerative braking energy values are given as input to the prediction module 126 which comprises Machine Learning (Function approximation) algorithm, to arrive at a predicted available regenerative braking energy value.

A step 318 comprises scaling the predicted available regenerative braking energy value, which is performed in two stages. At first stage, the scaling is done based on the mean AI deviation factor, which is calculated and received from the first deviation module 212. At second stage, the scaling is done on the output of the first stage based on the mean AVV deviation factor, which is calculated and received from the second deviation module 214. Thus, the output of the second stage is the final available regenerative braking energy.

In accordance to an embodiment of the disclosure, the device 120 dynamically predicts the available regenerative braking energy originated from random longitudinal deceleration maneuvers for the chosen route from source location to the chosen destination location for any hybrid or electric vehicle. The device 120 improves fuel efficiency and reduces emissions. By dynamically controlling battery SoC setpoint of the hybrid or the electric vehicle in accordance with the predicted available regenerative braking energy, improves the regenerative braking efficiency, which in turn leads to fuel efficiency improvement and emission reduction. The device 120 also improves range (mileage) estimation accuracy for hybrid electric and pure electric vehicles. A total regenerative braking energy for an upcoming trip can be known at an earlier time itself, even before the start of the trip. By comparing the predicted regenerative braking energies of various routes for the given source and destination location, a cost-effective route can be identified and suggested to the driver. An excess energy can be transferred from the target vehicle 102 to another vehicle that is in need of energy, if the target vehicle 102 foresees an energy input during the course of journey.

It should be understood that embodiments explained in the description above are only illustrative and do not limit the scope of this disclosure. Many such embodiments and other modifications and changes in the embodiment explained in the description are envisaged. The scope of the disclosure is only limited by the scope of the claims.

What is claimed is:

1. A method to determine available regenerative braking energy in a route for a target vehicle using a device, the target vehicle including at least one electric machine and a navigation unit configured to receive an input signal concerning a source and a destination from a driver, the device in communication with the navigation unit, the method comprising:

splitting at least one route, between said source and said destination, into multiple segments;

determining vehicular data of said target vehicle; and determining said available regenerative braking energy in said at least one route for said target vehicle based on relevant vehicular data of said target vehicle and other vehicles, wherein said other vehicles correspond to vehicles which have travelled through said at least one route, wherein determining said available regenerative braking energy, comprises:

filtering, by a filter module, said other vehicles from a repository whose relevant vehicular data corresponds to said relevant vehicular data of said target vehicle;

calculating, by a computation module, a deviation factor of an aggressiveness index of said target vehicle and a vehicle velocity profile for said target vehicle, in each segment of said multiple segments of said at least one route, using corresponding vehicular data of said target vehicle and said filtered vehicles;

calculating, by a regenerative energy module, available regenerative braking energy for each of said filtered vehicles in each segment of said multiple segments of said at least one route based on said relevant vehicular data, comprising corresponding brake torque profile and vehicle velocity profile, and estimating, by a prediction module, said available regenerative braking energy for said target vehicle based on said calculated available regenerative braking energy of said filtered vehicles, wherein said vehicle velocity profile includes data based on a velocity of said target vehicle.

2. The method as claimed in claim 1, wherein said vehicular data comprises:
a class of said target vehicle,
a subclass of said target vehicle,
weather, day, date, and time,
specifications of the at least one electric machine,
specification of a battery of said target vehicle,
a mean Aggressive Index deviation factor of said target vehicle, and
a mean Average Vehicle Velocity deviation factor of said target vehicle.

3. The method as claimed in claim 1, further comprising:
controlling operation of said at least one electric machine to optimize recovery of said available regenerative braking energy in said target vehicle.

4. The method as claimed in claim 1, wherein determining said available regenerative braking energy is performed through at least one of a Vehicle Control Unit (VCU) and an external server wirelessly connected to said VCU.

5. A method for determining available regenerative braking energy in a route for a target vehicle, the method comprising:
acquiring navigational inputs concerning a source and a destination from a driver, through a navigation unit;
splitting at least one route between said source and said destination into multiple segments;
determining vehicular data of said target vehicle; and
determining said available regenerative braking energy in said at least one route for said target vehicle based on relevant vehicular data of said target vehicle and other vehicles, wherein said other vehicles correspond to vehicles which have travelled through said at least one route, wherein determining the available regenerative braking energy comprises:

filtering, using a filter module, said other vehicles from a repository whose relevant vehicular data corresponds to said relevant vehicular data of said target vehicle;

calculating, by a computation module, a deviation factor of an aggressiveness index of said target vehicle and a vehicle velocity profile for said target vehicle, for each segment of said multiple segments of said at least one route, using relevant vehicular data of said target vehicle and said filtered vehicles;

calculating, by a regenerative energy module, available regenerative braking energy for each of said filtered vehicles in each segment of said multiple segments of said at least one route based on said relevant vehicular data comprising corresponding brake torque profile and vehicle velocity profile, and estimating, by a prediction module, said available regenerative braking energy for said target vehicle based on said calculated available regenerative braking energy of filtered vehicles, wherein said vehicle velocity profile includes data based on a velocity of said target vehicle.

6. The method as claimed in claim 5, wherein said vehicular data comprises:
a class of said target vehicle,
a subclass of said target vehicle,
weather, day, date, and time,
specifications of the at least one electric machine,
specification of a battery of said target vehicle,
a mean Aggressive Index deviation factor of said target vehicle, and
a mean Average Vehicle Velocity deviation factor of said target vehicle.

7. The method as claimed in claim 5, further comprising:
controlling operation of said at least one electric machine to optimize recovery of available regenerative braking in said target vehicle.

8. The method as claimed in claim 5, wherein determining said available regenerative braking energy is performed through at least one of a Vehicle Control Unit (VCU) and an external server wirelessly connected to said VCU.

* * * * *